Nov. 10, 1964  J. E. CHAPMAN  3,156,093
THERMODYNAMIC ENGINE
Filed March 8, 1961
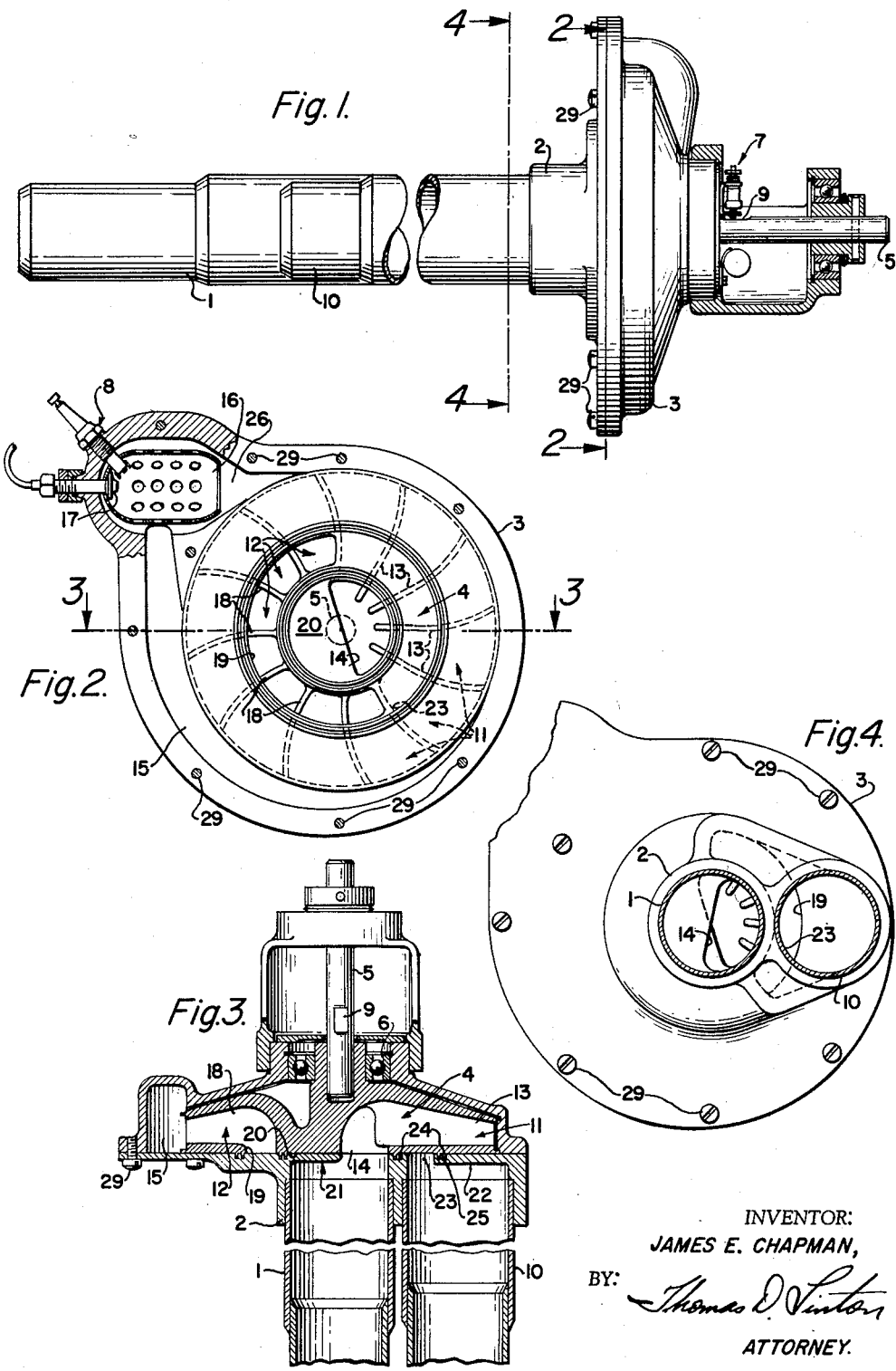
INVENTOR:
JAMES E. CHAPMAN,
BY: Thomas D. Vinton
ATTORNEY.

United States Patent Office 3,156,093
Patented Nov. 10, 1964

3,156,093
THERMODYNAMIC ENGINE
James E. Chapman, Palos Verdes Estates, Calif., assignor to The Garrett Corporation, Los Angeles, Calif., a corporation of California
Filed Mar. 8, 1961, Ser. No. 94,363
9 Claims. (Cl. 60—39.43)

This invention relates to a thermodynamic engine, and is particularly concerned with an engine which includes a single wheel compressor-turbine unit having intake and exhaust tubes which accentuate, at a certain predetermined frequency, resonant pulsations of inflowing air and gases which are exhausted from the engine.

In conventional thermodynamic engines, gases of combustion are discharged from the combustion chamber into a turbine unit. Energy expended by the gases of combustion within the turbine unit is utilized for developing shaft horsepower, and also for operating a compressor or turbocharger unit. The turbocharger unit functions to supply supercharged air to the combustion chamber. Thus, in the conventional engine of this type, only a partial amount of energy expended within the turbine unit is utilized for developing shaft horsepower. Some of this energy must be utilized for operating the turbocharger unit. Also, because of the complex arrangement of mechanical linkages, and moving parts, additional energy is dissipated, and therefore not utilized for developing a useful output of shaft horsepower.

Accordingly, an important object of this invention is to provide a compact thermodynamic engine having high operating efficiency.

Another object of the invention is a compact internal combustion turbine engine in accordance with the initial object which is simply constructed so that all possible avialable energy may be effectively utilized for developing a useful output of shaft horsepower.

Another object of the invention is a thermodynamic engine in accordance with the initial object which includes a single wheel compressor-turbine unit.

Another object of the invention is a thermodynamic engine in accordance with the initial object having intake and exhaust tubes which, at a certain predetermined frequency, accentuate resonant pulsations of inflowing air and gases which are exhausted from the engine.

Another object of the invention is to provide a thermodynamic engine having intake and exhaust tubes which produce resonance at a frequency of intermittent intake and exhaust pulses corresponding to the rated speed of the engine, the tubes being so constructed that adjustments in their dimensions may be made so as to effect variations in the resonant frequencies of inflowing air and exhaust gases.

Another object of the invention is to provide a compact thermodynamic engine which is so constructed that optimum pressure conditions are established for effectuating high efficiency in operation of the engine.

That these and other objects and advantages of the invention are attained will be readily apparent from a consideration of the following description when taken in conjunction with the drawings, in which:

FIG. 1 is a front elevational view of the thermodynamic engine;

FIG. 2 is a cross-sectional view taken on line 2—2 of FIG. 1;

FIG. 3 is a plan-sectional view taken on lines 3—3 of FIG. 2; and

FIG. 4 is a cross-sectional view taken on line 4—4 of FIG. 1.

Referring to FIG. 1 of the drawings, there is illustrated a thermodynamic engine having an intake tube 1. Intake tube 1 is connected to a housing member 2 by welding or by other well known means. Housing 2 is maintained in juxtaposition with a housing member 3 by means such as a plurality of screws 29. Housing members 2 and 3 surround and completely enclose a single wheel compressor-turbine unit 4. Projecting from housing 3 is a power take-off shaft 5 which is joined with the single wheel compressor-turbine unit 4 in a well known manner, so as to become an integral part of unit 4. The single wheel compressor-turbine unit 4 and shaft 5 rotate as one unit. Shaft 5 and wheel unit 4 are journaled within bearing member 6 mounted within housing 3. A distributor 7, of conventional design, is actuated by shaft 5 so as to control a spark plug igniter, shown as 8 in FIG. 2. Shaft 5 is cammed at 9 so as to actuate distributor 7 as shaft 5 rotates. Extending from housing 2 is an exhaust tube 10 which produces resonant pulsations of gases exhausted from compressor-turbine unit 4.

In FIG. 2 the single wheel compressor-turbine unit 4 is shown as including two structurally different and independently functioning sections. The sections designated 11 function as compressor sections, while the sections designated 12 function as turbine sections. Compressor sections 11 are formed by adjacently disposed blading portions 13. The compressor sections 11 are open at both their radial innermost and radial outermost extremities so as to receive inflowing air from intake tube 1 through port 14, and to exhaust compressed air into passage 15. Compressed air exhausted from compressor sections 11 flows through passage 15 into a combustion chamber 16. Combustion chamber 16 is provided with an injection nozzle 17, and the igniter plug 8. As indicated hereinbefore, igniter plug 8 is intermittently energized by distributor 7. Turbine sections 12 are formed by adjacently disposed blading portions 18. The turbine sections 12 are open at their radial outermost extremities so as to receive gases of combustion produced within combustion chamber 16. The radial innermost extremities of turbine sections 12 have a common opening 19. The blading portions 18 of turbine sections 12 radially project from section 20 of the single wheel compressor-turbine unit 4.

Intake tube 1 and exhaust tube 10 are mounted within housing member 2. A projecting portion 21 of housing member 2 abuts tube 1 to form intake port 14. Air enters the compressor sections 11 through port 14. Housing 2 also has a projecting portion 22 which abuts tube 10 to form an exhaust port 23 through which gases of combustion are exhausted from turbine sections 12. Housing 2 is provided with sealing means 24 which engage sealing means 25 on the single wheel compressor-turbine unit 4.

When the internal combustion-turbine engine is in operation air enters intake tube 1. Tube 1 is constructed in conformance with predetermined dimensional requirements so as to accentuate resonant pulsations of air being delivered to the single wheel compressor-turbine unit 4. Tube 1 normally has dimensions which will produce resonance at a frequency corresponding with intermittent intake pulses at rated engine speed. However, tube 1 may be telescopically constructed so that adjustment in dimensions of the tube may be made so as to effectuate variations in resonant frequencies of the inflowing air. Air flowing through resonant tube 1 enters compressor sections 11 through intake port 14. As the single wheel unit 4 rotates in a clockwise direction, air entering sections 11 is compressed by centrifugal force as unit 4 rotates under the propulsion influence of gases of combustion expelled from combustion chamber 16. The movement of air within sections 11, under the influence of centrifugal force, is toward the periphery of these compressor sections. Thus, the effect of a lower pressure zone in the vicinity of intake port 14 is thereby established. Air compressed within sections 11 passes through passage 15 into combustion chamber 16. Combustible fuel is injected into chamber 16 through an injection nozzle 17. The mixture of combustible fuel and compressed air is ignited by igniter plug 8 which is intermittently energized by distributor 7 as described hereinbefore. The products of combustion produced within chamber 16 pass through nozzle 26 into turbine sections 12 where the combustion products transfer their energy to the turbine blading of sections 12, thereby supplying the energy by which the single wheel compressor-turbine unit 4 is rotated. Thus, since shaft 5 is an integral part of wheel unit 4 and rotates therewith, energy transferred from the products of combustion, produced within chamber 16, is converted into useful shaft horsepower at shaft 5.

After the gases of combustion have expended their energy within turbine sections 12, these gases are exhausted through outlet ports 19 and 23 when port 19 communicates with port 23. As unit 4 rotates in a clockwise direction the solid section 20 of single wheel unit 4 covers intake port 14. When intake port 14 is entirely covered by section 20, outlet ports 19 and 23 are in coincidence. In this position of rotational orientation turbine sections 12 are provided with a maximum exhaust area through the ports 19 and 23. Also, when wheel unit 4 is in this rotational position the incoming supply of air flowing through resonant tube 1 and intake port 14 is completely obstructed. The momentum of the air mass flowing through intake tube 1, combined with resonant pulsations effected by intake tube 1, produces an appreciable increased pressure condition in the vicinity of intake port 14. This increased pressure condition in the vicinity of port 14 produces the effect of supercharging incoming air supplied to compressor sections 11.

As wheel unit 4 continues its clockwise rotation, under the influence of products of combustion entering turbine sections 12 through nozzle 26, the solid section 20 of wheel unit 4 uncovers inlet port 14. As inlet port 14 is uncovered supercharged air passes into compressor sections 11. Centrifugal force within compressor sections 11, caused by the rotataion of single wheel unit 4, produces a depressed pressure zone within sections 11 in the vicinity of intake port 14. The lowered pressure zones within sections 11, and the increased pressure or supercharged air zones within intake tube 1 create optimum pressure conditions for the intake of air into the compressor sections 11.

While inflowing air is being supercharged within intake tube 1, the products of combustion are being exhausted from turbine sections 12 through outlet ports 19, 23 and exhaust tube 10. The dimensions of exhaust tube 10 are such that resonant pulsations within the gases of combustion are produced as these products of combustion are exhausted through tube 10. Tube 10 normally has dimensions which will produce resonance at a frequency corresponding with intermittent exhaust pulses at rated engine speed. However, tube 10 may be telescopically constructed so that adjustments in dimensions of the tube may be made so as to effectuate variations in resonant frequencies of the exhaust gases. The resonant pulsations produced within exhaust tube 10 create an under pressure, or partial vacuum in the vicinity of exhaust port 23. The under pressure or partial vacuum condition produced by exhaust resonant tube 10, in the vicinity of exhaust port 23, aids in the scavenging of combustion products from turbine sections 12. In this manner conditions of optimum pressure differential are established so as to effectuate efficient operation of the thermodynamic engine.

As the single wheel unit 4 continues its clockwise rotation, intake port 14 is fully opened, and exhaust port 23 is closed. Thus, the second cycle in the operation of the internal combustion turbine engine thereby begins.

It will be apparent to those skilled in the art that the novel principals of the invention disclosed herein will suggest various other modifications and applications of the same. It is accordingly desired that the present invention shall not be limited to the specific embodiment thereof described herein.

Having thus described my invention, I claim:

1. An internal combustion engine comprising: a rotary member; compressor sections within said rotary member; means for effecting resonant pulsations of air flowing into said rotary member so as to deliver supercharged air to said compressor sections; a combustion chamber; means for transferring air at high pressure from said compressor sections to said combustion chamber; means in operational relationship with said combustion chamber for developing energy to act upon said rotary member; means for transferring energy from said combustion chamber to activate said rotary member; and means for converting energy acting upon said rotary member into useful power output.

2. An internal combustion engine comprising: a rotary member; compressor sections within said rotary member; turbine sections within said rotary member; means for effecting resonant pulsations of air flowing into said rotary member so as to deliver supercharged air to said compressor sections during one operational phase of said engine; a combustion chamber; means for transferring air at high pressure from said compressor sections to said combustion chamber; means in operational relationship with said combustion chamber for developing energy to act upon said rotary member; means for transferring energy from said combustion chamber to said turbine sections so as to activate said rotary member; and means for developing useful power output from said rotary member.

3. A thermodynamic engine comprising: a rotary member; means for delivering a flow of air to said rotary member constructed and arranged so as to accentuate resonant pulsations of inflowing air thereby supercharging air delivered to said rotary member; means within said rotary member for increasing the pressure of inflowing air; a combustion chamber; means for transferring air at high pressure from said rotary member to said combustion chamber; means for generating combustion products within said combustion chamber; means for delivering combustion products from said combustion chamber to said rotary member; and means wtihin said rotary member for converting energy from combustion products to useful power output.

4. A thermodynamic engine comprising: a rotary member; means for delivering a flow of air to said rotary member constructed and arranged so as to accentuate resonant pulsations of inflowing air thereby supercharging air delivered to said rotary member; means within said rotary member for increasing the pressure of inflowing air; a combustion chamber; means for transferring air at high pressure from said rotary member to said combustion chamber; means for generating combustion products within said combustion chamber; means for delivering combustion products from said combustion chamber to said rotary member; means within said rotary member for converting energy from combustion products to useful power output; and means for exhausting combustion products from said rotary member constructed and arranged so as to accentuate resonant pulsations of exhaust products thereby lowering the pressure in said exhaust means so as to aid in the scavenging of exhaust products from said rotary member.

5. A thermodynamic engine in accordance with claim 4 wherein said means for accentuating resonant pulsations of inflowing air is so constructed that dimensional adjustments may be made in said means so as to effect a change of frequency in resonant pulsations of inflowing air.

6. A thermodynamic engine in accordance with claim 4 wherein said means for accentuating resonant pulsations of exhaust products is so constructed that dimensional adjustments may be made in said means so as to effect a change of frequency in resonant pulsations of exhaust products.

7. A thermodynamic engine comprising: a rotary member having two structurally different and independently functioning sections; an intake tube for air constructed and arranged so as to accentuate resonant pulsations of air flowing into said rotary member and thus supercharge air delivered to said rotary member; means within said rotary member for raising the pressure of inflowing air; a combustion chamber; means for transferring air at high pressure from rotary member to said combustion chamber; means in operational relationship with said combustion chamber for developing energy for acting upon said rotary member; means for transferring energy from said combustion chamber to activate said rotary member; and means for converting energy acting upon said rotary member into useful power output.

8. A thermodynamic engine comprising: a rotary member having two structurally different and independently functioning sections; an intake tube for air constructed and arranged so as to accentuate resonant pulsations of air flowing into said rotary member thereby supercharging air delivered to said rotary member; means within said rotary member for raising the pressure of inflowing air; a combustion chamber; means for transferring air at high pressure from said rotary member to said combustion chamber; means in operational relationship with said combustion chamber for developing energy for acting upon said rotary member; means for transferring energy from said combustion chamber to activate said rotary member; means for converting energy acting upon said rotary member into useful power output; and an exhaust tube constructed and arranged so as to accentuate resonant pulsations of exhaust products from said rotary member thereby lowering the pressure in said exhaust tube so as to aid in the scavenging of exhaust products from said rotary member.

9. A thermodynamic engine comprising: a rotary member; compressor sections within said rotary member; turbine sections within said rotary member; means for effecting resonant pulsations of air flowing into said rotary member so as to deliver supercharged air to said compressor sections; a combustion chamber; means for transferring air at high pressure from said compressor sections to said combustion chamber; means for generating combustion products within said combustion chamber; means for transferring combustion products from said combustion chamber to said turbine sections; means for converting energy from combustion products to useful power output; and means for exhausting combustion products from said turbine sections during one operational phase of said engine.

References Cited in the file of this patent

UNITED STATES PATENTS

| | | |
|---|---|---|
| 1,339,730 | Williams | May 11, 1920 |
| 2,350,005 | Wilcoxson | May 30, 1944 |
| 2,480,626 | Bodine | Aug. 30, 1949 |
| 2,514,874 | Kollsman | July 11, 1950 |
| 2,537,344 | Gruss | Jan. 9, 1951 |
| 2,540,269 | Le Clair | Feb. 6, 1951 |
| 2,543,758 | Bodine | Mar. 6, 1951 |
| 2,593,523 | Bauger | Apr. 22, 1952 |
| 2,640,314 | Abel | June 2, 1953 |
| 2,659,198 | Cook | Nov. 17, 1953 |
| 2,683,961 | Britton | July 20, 1954 |

FOREIGN PATENTS

| | | |
|---|---|---|
| 99,380 | Switzerland | May 16, 1923 |